(12) United States Patent
Taylor

(10) Patent No.: US 10,481,380 B2
(45) Date of Patent: Nov. 19, 2019

(54) EZ VIEW IMAGE REFLECTING ASSEMBLY

(71) Applicant: Gerald Arthur Taylor, Coventry, RI (US)

(72) Inventor: Gerald Arthur Taylor, Coventry, RI (US)

( * ) Notice: Subject to any disclaimer, the term of this patent is extended or adjusted under 35 U.S.C. 154(b) by 0 days.

(21) Appl. No.: 15/732,232

(22) Filed: Oct. 10, 2017

(65) Prior Publication Data

US 2018/0136453 A1    May 17, 2018

Related U.S. Application Data

(60) Provisional application No. 62/496,786, filed on Oct. 28, 2016.

(51) Int. Cl.
*G02B 23/08* (2006.01)
*G02B 7/182* (2006.01)

(52) U.S. Cl.
CPC ............. *G02B 23/08* (2013.01); *G02B 7/182* (2013.01)

(58) Field of Classification Search
CPC .................................................... G02B 23/08
See application file for complete search history.

(56) References Cited

U.S. PATENT DOCUMENTS

| | | | | |
|---|---|---|---|---|
| 1,907,314 | A * | 5/1933 | Baer | G02B 23/2476 362/138 |
| 2,193,217 | A * | 3/1940 | Allen | G02B 23/08 359/862 |
| 3,071,035 | A * | 1/1963 | Zaubi | G02B 17/02 359/439 |
| 3,140,339 | A * | 7/1964 | Nisperly | G02B 23/08 248/481 |
| 3,262,364 | A * | 7/1966 | Kollmorgen | G02B 23/08 359/862 |
| 4,072,406 | A * | 2/1978 | Amesbury | G02B 5/00 359/601 |
| 6,248,094 | B1 * | 6/2001 | Epperson | A61M 5/322 604/110 |

FOREIGN PATENT DOCUMENTS

| | | | | |
|---|---|---|---|---|
| GB | 718550 A | * | 11/1954 | ......... G02B 27/2235 |
| JP | 3180090 U | * | 12/2012 | |

* cited by examiner

*Primary Examiner* — Charlie Y Peng

(57) ABSTRACT

An adjustable reflecting device is disclosed. The reflection of a light emitting diode (LED) or a similarly lighted appliance relayed to a more accessible viewing location is accomplished by using 2 planar reflective surfaces (mirrors) situated in a housing. The mirrors are adjustable to direct the reflection of the intended image or lighted object to the observers eye. The first mirror (housing mirror) reflects the image and relays it to the second mirror (tube mirror) through adjustments made by the observer. Once the adjustments are made, the mirrors can be locked in the position from a desired location for viewing.

1 Claim, 2 Drawing Sheets

EZ VIEW IMAGE REFLECTING ASSEMBLY

BACKGROUND OF THE INVENTION

Field of the Invention

Manufactured (or mobile) homes that are located in climates where the temperature frequently goes below freezing in winter and need some type of Heat Trace Tape applied to the incoming fresh water lines to keep the incoming fresh water from freezing.

Most manufactured homes have a 110 volt electrical outlet installed in close proximity to the water inlet for such appliances. Most heat tapes manufactured today have an LED (Light Emitting Diode) formed into the clear male end of the plug along with some circuitry while others have an LED in line.

When the heat tape is working normally the plug or (other in line light) is lit.

Most manufactured homes when installed are several feet off the ground which requires a skirt or apron to be installed that extends from the bottom of the home to the ground.

The water line and heat tape are then obscured by the skirting requiring removal of said skirting (or apron) to periodically check the status of the heat tape.

The invented device allows adjustable horizontal or vertical viewing of the lighted image of the heat tape LED from outside the dwelling without removal of the skirting every time.

DESCRIPTION OF THE INVENTION

This device is comprised of a weatherproof housing containing an adjustable mirror which reflects the image of an lighted device to a second adjustable mirror in a rotatable tube suspended from the housing which further reflects the image to the eye of the observer.

The device is secured to the skirting (or apron) of a mobile home with a mounting bracket over a small opening in the in direct line of the image to be reflected which primarily is the LED (illuminated 110v plug) from a heating tape for water lines.

BRIEF DESCRIPTION OF DRAWINGS

All descriptions FIG. 1 unless noted
1) Cover (housing); FIG. 2 only
2) Housing
3) image inlet
4) housing planar reflective surface (housing mirror)
5) control arm
6) magnets
7) reflector tube
8) reflector tube planar reflective surface (tube mirror)
9) lock nut: FIG. 1 only
10) bottom plate
11) reflector tube retainer
12) reflector tube top ring
13) reflector tube lock
14) Clear Cover ring: FIG. 2 only
15) clear cover
16) viewing port
17) mounting bracket

DETAILED DESCRIPTION OF THE DRAWINGS

This model was designed specifically for use on Manufactured or Mobile homes however it can be modified for other uses.

Using various methods and weatherproof materials such as plastic injection molding, vacuum forming of plastic, vinyl, aluminum or similar to produce the device.

Reference should be made to the accompanying drawings.

Figure 1:
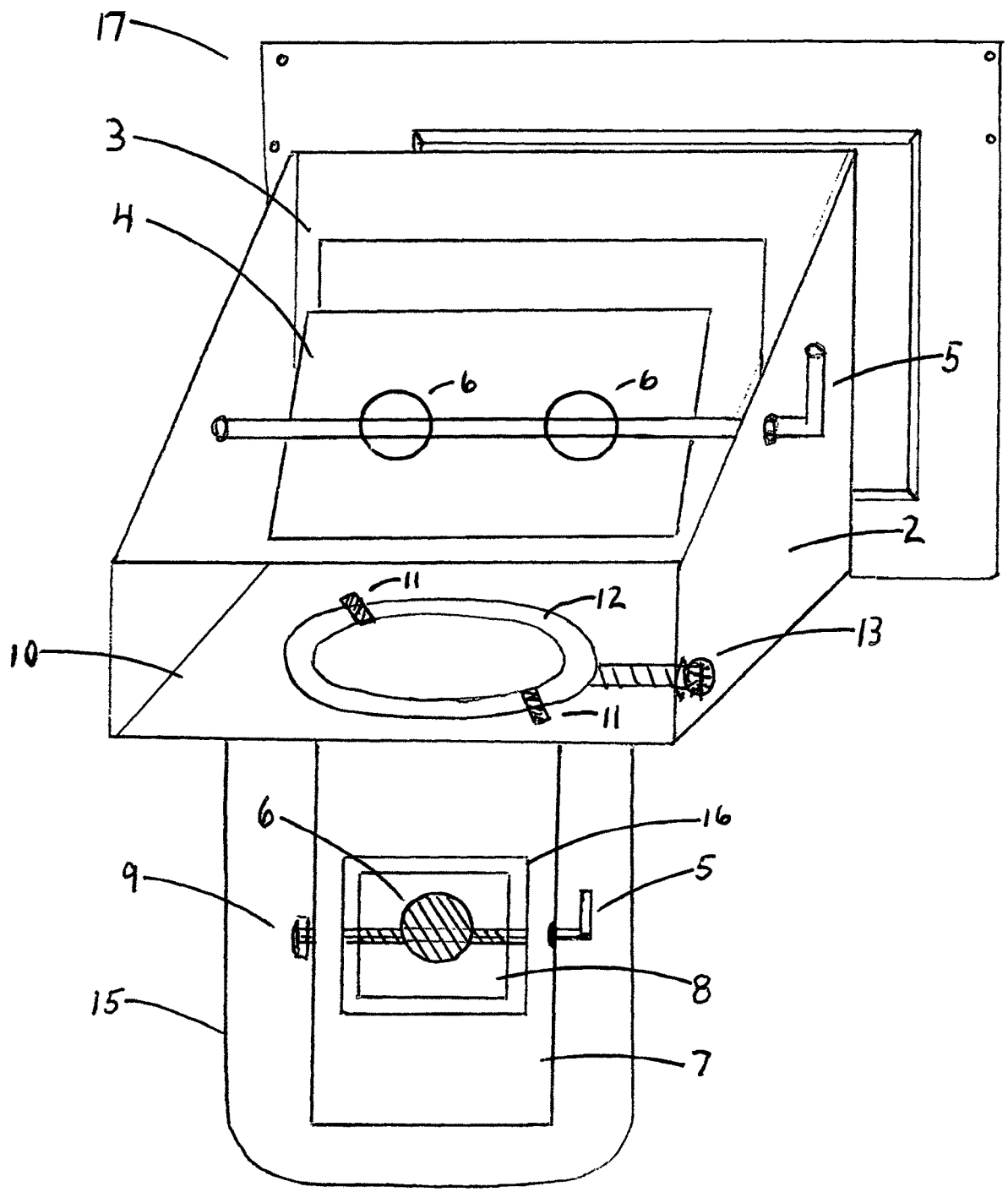
FIG. 1 is an exposed front view of the reflecting assembly in the intended mounted upright position.

FIG. 1 is an exposed front view.

Figure 2:
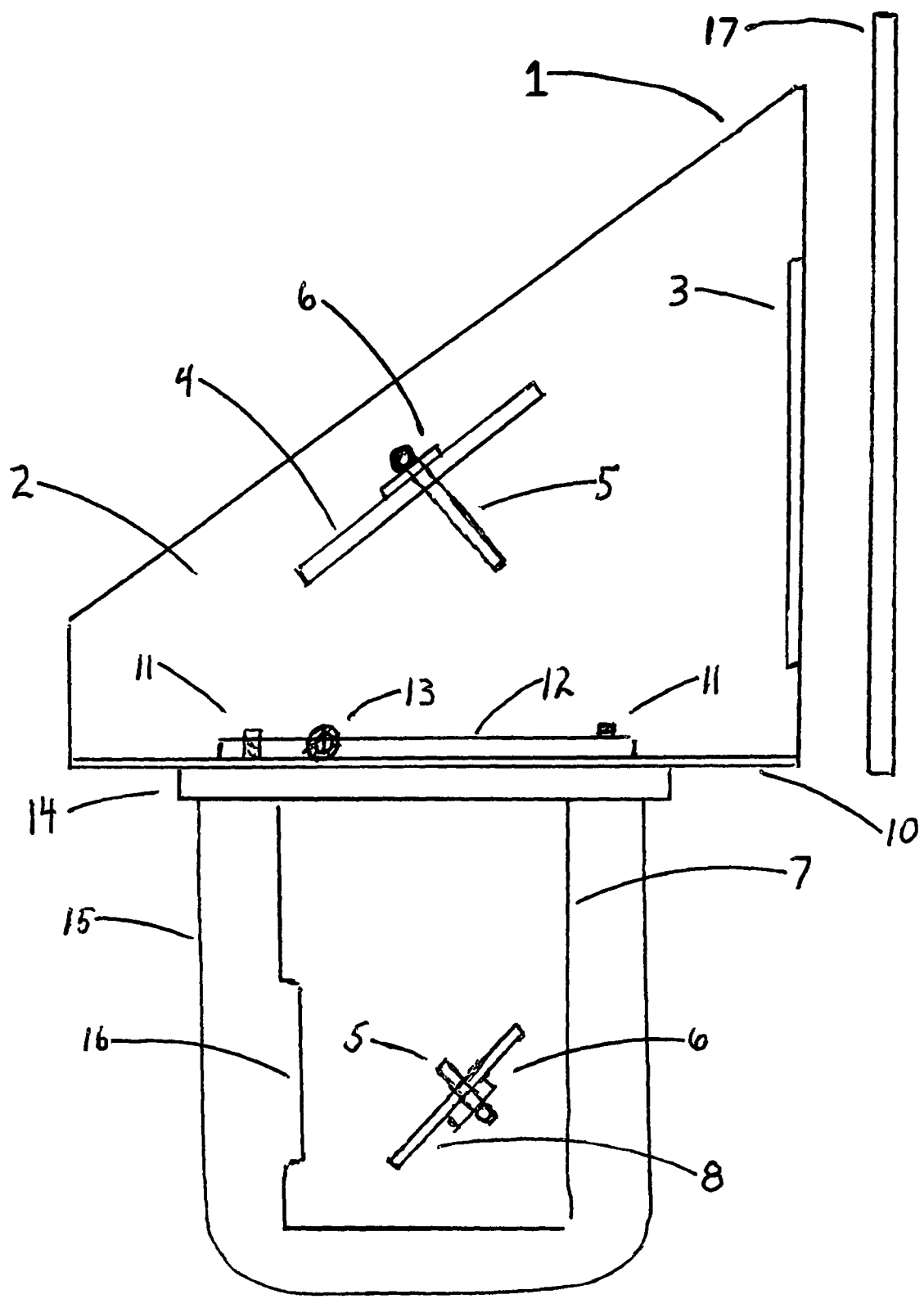
FIG. 2 is an exposed right side view of the reflecting assembly when looking from the front in the intended upright position.

FIG. 2 is a side view (right side profile)

The two main parts are the housing (FIG. 1 #2) and the reflector tube (FIG. 1 #7).

Housing will have a detachable cover for maintenance.

Mirrors, FIGS. 1 #(4) and (8) can be referred to as any type of reflector which presents a clear image for reflective purposes. Thickness should not exceed ⅛ inch.

Ideally the size of the housing should not exceed that of a residential dryer vent (4" times 4"). The housing, having four sides and a bottom. Plate should have a 3.5" times 3.5" (or similar size) bottom plate which would be attached to the bottom of the housing.

A 2.5" (or similar) hole is cut, or formed in the bottom plate to accept the reflector tube (FIG. 1 #7).

The housing (2), having four sides, should have a 1.25" front (or similar) and 5.5" rear.

The two sides should then produce a 55 degree angle (or similar) from back to front.

At the rear there should be a 3" times 3" opening (or similar) for receiving the image (FIG. 1 #3). (FIG. 1 #5) Control arm is a threaded (#8-32 or similar).

Both of the control arms have a 45 degree bend at one end and open threads at the other end to accept a lock nut.

The 45 degree bend is used as a handle to rotate the rod on it's axis thereby adjusting the mirror.

The ferrous rod will also have a flat spot(s) to accept the magnets (FIG. 1 #6) for more holding area on the face of the magnet and rod.

The housing mirror, (FIG. 1 #4) will have two magnets equally spaced in the center of the axis while the lower magnet will have one magnet centered on the non reflective side.

The mirror tube top ring (FIG. 1 #12) will have an outside diameter larger than the hole in the bottom plate (FIG. 1#10).

The magnets will be affixed to the mirrored tiles with adhesive in the center for tube mirror and two magnets on center line equally spaced for the housing mirror.

The mirror tube (FIG. 1 #7) can be either a round tube or square tube depending on the materials used as long as there is room for the mirror to move freely.

The control rod made of threaded steel can be filed or ground at the points to accept the magnets.

A nylon lock nut, or similar, is used (FIG. 1 #9) to hold the rods in place.

In the housing and tube there will be threaded holes in each side of the housing to accept the rod and hold it more firmly. Additional support may be used for threads.

Reflector tube retainers (FIG. 1 #11) are installed with small screws or similar to hold the tube in it's desired location.

A (FIG. 2 #14) Cover ring is attached to the bottom of the housing to accept the top of the clear cover (FIG. 1 #15).

A Clear plastic cover slightly larger than the reflector tube (FIG. 1, #15).

Mounting bracket which is slightly larger than the rear of the housing with an opening matching that of the housing for the image inlet.

A reflecting tube lock, (bolt, FIG. 1, #13) is installed to lock the rotatable tube in place by tightening the bolt with a screwdriver or similar.

LISTING OF PRIOR ART

U.S. Pat. No. 751,569A Altiscope
U.S. Pat. No. 1,006,230A Periscope
U.S. Pat. No. 5,418,652A Deflection Mirror Housing
U.S. Pat. No. 1,260,341A Image Reflector Although similar in concept, prior art does not meet the criteria of the stated invention.

OPTIONS

In some cases, a smoke/noxious fume detector, can be coupled with the EZ-View IRA as most mobile or manufactured homes have a crawlspace which is covered with a skirt or apron and has limited access.

What is claimed is:

1. An adjustable Image Reflecting Assembly, acting as a periscope, using a parallel relation of mirrors to relay a virtual illuminated image from a light source (LED) light produced by a water line heating tape installed under a manufactured home to be viewed from a distance, comprising an upright housing having five sides including a bottom side, a front side, two sloping sides and a rear open side providing an image inlet supporting a mounting bracket for mounting the adjustable image reflecting assembly, a front one quarter the size of the back at a fifty five degree angle in relation to level ground supporting a weatherproof top cover and a ferrous control rod connected to a mirror with the reflective side facing downward situated directly above a hollow reflector tube, a bottom plate with a circular opening in the center supporting an upright square hollow reflector tube situated directly below the housing ferrous control rod protected by a weatherproof clear cover.

* * * * *